(12) United States Patent
Chaimberg

(10) Patent No.: US 6,920,712 B2
(45) Date of Patent: Jul. 26, 2005

(54) COMPOSITE LAMINATED PRINT AND FRAME AND METHOD OF FABRICATION

(76) Inventor: Michael Chaimberg, 6664 St. Patrick St., Montreal, Quebec (CA)

(*) Notice: Subject to any disclaimer, the term of this patent is extended or adjusted under 35 U.S.C. 154(b) by 0 days.

(21) Appl. No.: 10/771,456

(22) Filed: Feb. 5, 2004

(65) Prior Publication Data

US 2005/0066559 A1 Mar. 31, 2005

(30) Foreign Application Priority Data

Sep. 25, 2003 (CA) .................................. 2442760

(51) Int. Cl.$^7$ .............................................. A47G 1/06

(52) U.S. Cl. ......................................... 40/768; 40/603

(58) Field of Search .......................... 40/768, 773, 797, 40/603

(56) References Cited

U.S. PATENT DOCUMENTS

| | | | | |
|---|---|---|---|---|
| 3,964,946 A | * | 6/1976 | Falk ............................ | 156/59 |
| 4,216,286 A | * | 8/1980 | Greene et al. .............. | 430/203 |
| 4,528,233 A | * | 7/1985 | Free ............................ | 428/205 |
| 2002/0104607 A1 | * | 8/2002 | Kemkes ...................... | 156/161 |

* cited by examiner

Primary Examiner—Cassandra Davis
(74) Attorney, Agent, or Firm—Ogilvy Renault; Guy J. Houle

(57) ABSTRACT

A composite laminated print and frame and method of fabrication is described. A canvas sheet is secured on a flat outer contour surface of a circumferential hollow frame member such that the canvas sheet is accessible from behind the frame. A printed image sheet is bonded on a clear plastic film sheet with an image of the sheet facing the clear plastic film sheet. The plastic film has a marginal extension portion all about the image sheet. The marginal extension portion extends over a circumferential outer side wall of the frame member and is held taunt by fasteners over the canvas sheet with the image facing outwardly. The canvas is visible and touchable from the rear of the frame given the impression that the image is directly on the canvas.

16 Claims, 3 Drawing Sheets

COMPOSITE LAMINATED PRINT AND FRAME AND METHOD OF FABRICATION

TECHNICAL FIELD

The present invention relates to a composite laminated print and frame and a method of fabrication and wherein a canvas sheet is secured to the frame under-an image sheet which is bonded to and under a clear plastic film sheet which is secured to the frame whereby the image appears to have been painted or printed directly on the canvas sheet.

BACKGROUND ART

It is known to print an image directly on canvas material and to then coat the image with a preservative coating and to secure the canvas about a frame so as to give the appearance that the printed image is an image which has been painted directly on canvas material. It is also known to print images on materials which resembles canvas or which has an embossment therein resembling canvas so as to give the appearance that the image is printed or painted directly on canvas material. Such printing processes, such as ink jet printers, or roller plate printers, are very costly and result in images, when printed on canvas, losing some of its clarity. Also, the printing process is very expensive. Accordingly, the price of the finished product is very high and requires large productions to justify the printing cost.

SUMMARY OF INVENTION

It is a feature of the present invention to provide a composite laminated print secured to a frame and a method of construction which overcomes the disadvantages of the prior art and which is substantially different than the prior art products and methods.

According to a broad aspect of the present invention there is provided a composite laminated print and frame and wherein the frame is a circumferential hollow frame member having a flat outer contour surface. A canvas sheet is disposed taunt over the frame and secured about the flat outer contour surface. A printed image sheet is bonded on a clear plastic film sheet with an image of the image sheet facing the clear plastic film sheet. The plastic film sheet has a marginal extension portion all about the image sheet. The marginal extension portion extends over a circumferential outer side wall of the frame member and is held taunt by fastening means to secure same to the frame member whereby the image sheet, adhered to the plastic film sheet, is held taunt over the canvas sheet with the image facing outwardly. The canvas sheet is visible and touchable from the rear of the hollow frame member.

According to a still further broad aspect of the present invention there is provided a method of constructing a composite laminated print and frame comprising the steps of providing a circumferential hollow frame member having a flat outer contour surface. A canvas sheet is disposed taunt over the frame. The canvas sheet is secured to the flat outer contour surface. A printed image sheet is laminated onto a clear plastic film sheet with an image of the image sheet facing the clear plastic film sheet. The plastic film sheet has a marginal extension portion all about the image sheet. The clear plastic film sheet is disposed over the frame member with the printed image sheet aligned with the flat outer contour surface and the image facing outwardly. The marginal extension portion is disposed over a circumferential outer side wall of the frame member and is pulled taunt thereover and an end portion of the marginal extension portion is secured to a rear face of the frame member.

BRIEF DESCRIPTION OF DRAWINGS

A preferred embodiment of the present invention will now be described with reference to the accompanying drawings in which.

DESCRIPTION OF PREFERRED EMBODIMENTS

Figure 1:
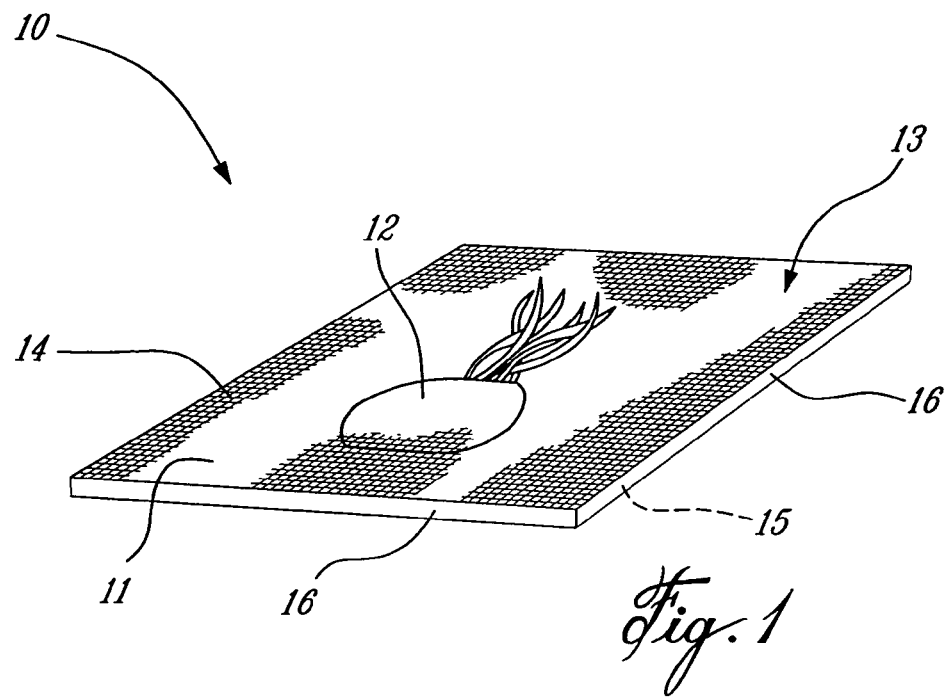
FIG. 1 is a perspective view of the composite laminated print on frame constructed in accordance with the present invention.

Referring now to the drawings and more particularly to FIG. 1 there is shown generally at 10 the composite laminated print on a hollow frame of the present invention. It comprises an image sheet 11 having an image 12 printed thereon and secured to a frame as will be described later. The image sheet is bonded behind a clear plastic film sheet 13 which may have a textured pattern 14 embossed therein. The plastic film sheet extends over side walls 15 of the frame as will be described later and is secured therebehind. The marginal extension portions 16 of the clear plastic film sheet 13, extending over the side walls 15 are painted whereby to delineate the side walls of the finished product from the image sheet 11.

Figure 2:
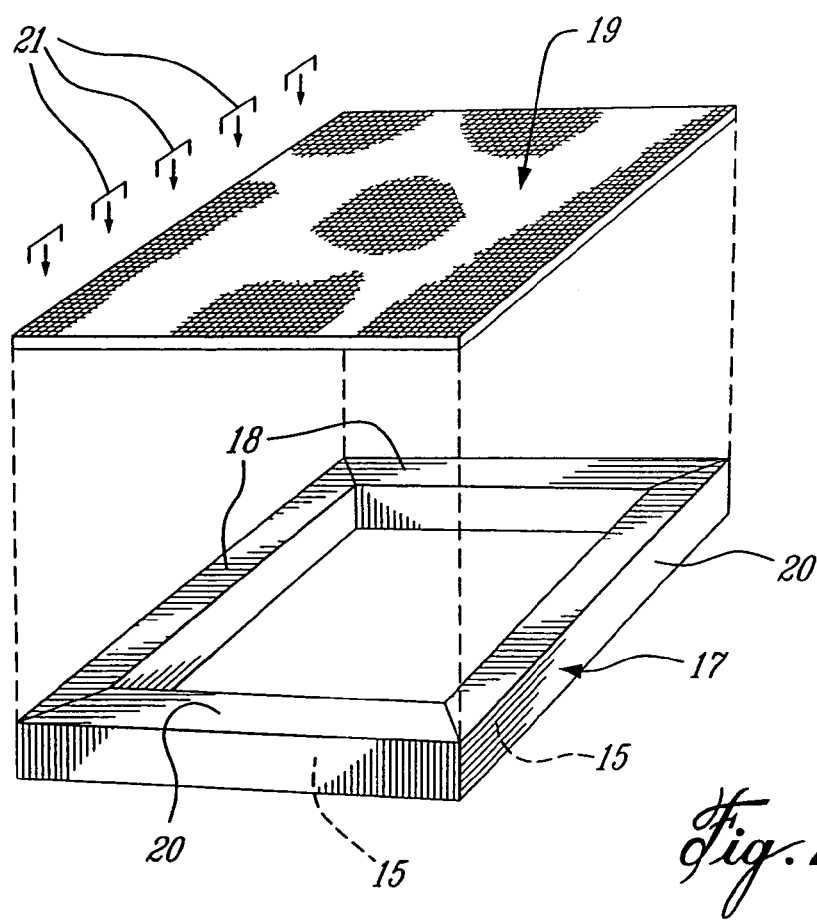
FIG. 2 is an exploded view showing the canvas sheet being secured to the circumferential hollow frame member, herein a rectangular frame member.
Figure 5:
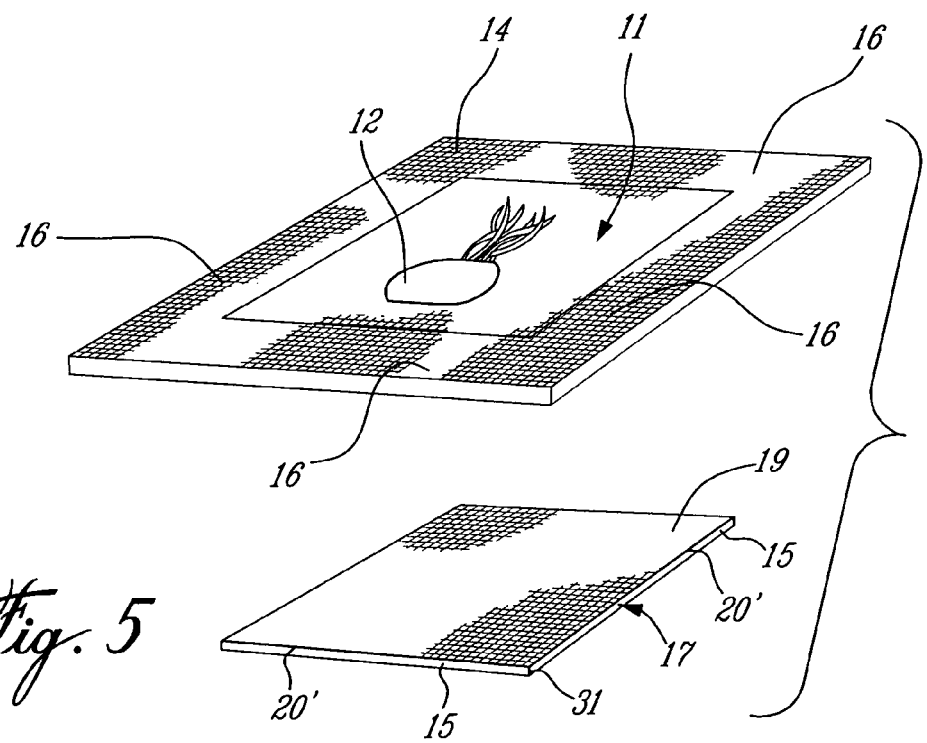
FIG. 5 is an exploded view showing the plastic film sheet having the image bonded thereon being aligned for securement onto the canvas sheet secured to the hollow frame member.
Figure 6:
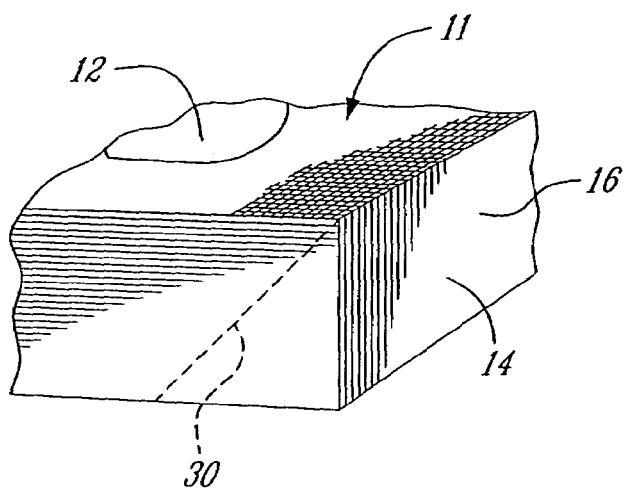
FIG. 6 is a fragmented enlarged view showing the plastic film sheet secured over the side walls of the hollow frame member with a concealed pleat formed in the corners of the frame member.

Referring now to the remaining Figures the construction and method of assembly of the composite laminated print on frame 10 will now be described. As shown in FIG. 2 the circumferential frame is herein shown as being a rectangular hollow frame member 17 but other shapes are conceivable. The rectangular frame member is constructed from wooden pieces or could conceivably be molded of plastic material and as hereinshown the frame elements 18 are of rectangular or square cross-section. A canvas sheet 19 is disposed and secured taunt over the flat outer surface 20 of the frame element 18 by the use of staple fasteners 21. It is also conceivable that it could be secured, by glue or other type fasteners. Accordingly, there is then provided, as shown in FIG. 5, a rectangular hollow frame member 17 having a canvas sheet 19 secured thereover and flush with the outer edges 201 of the flat outer surface 20 of the frame.

Figure 3:
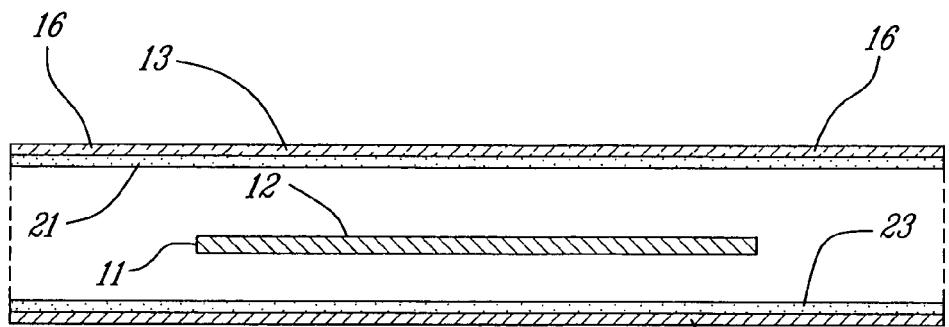
FIG. 3 is an exploded cross-section view showing the image sheet being laminated to a clear plastic film sheet and sandwiched between a clear plastic film sheet and a backing sheet having an adhesive release coating.

With reference now to FIG. 3 there is shown the image sheet 11 disposed at a predetermined position with respect to the clear plastic film sheet 13 and on an uncured adhesive coating 21 provided on a rear surface of the clear plastic film sheet 13. A backing sheet 22 having an adhesive release coating 23 holds the image sheet 11 in facial position on the uncured adhesive coating with the adhesive releasing coating of the backing sheet being held onto the tacky uncured adhesive coating 21 of the clear plastic sheet 11. Accordingly, the image sheet 11 is sandwiched and captive between the clear plastic film sheet 13 and the backing sheet 22, to form an assembly as designated by reference numeral 24 in FIG. 4.

Figure 4:
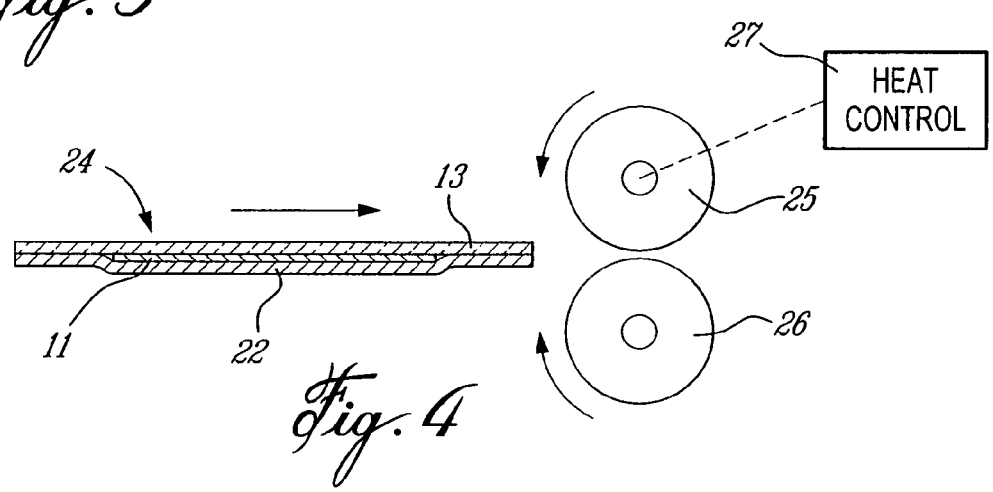
FIG. 4 is a simplified schematic view showing the assembled sheets of FIG. 3 being fed through a laminating machine herein schematically illustrated whereby to bond the image sheet onto the plastic film sheet.

This assembly 24 is then fed into a laminating machine, herein schematically illustrated in FIG. 4, and wherein the assembly 24 passes through pressing rollers 25 and 26 with roller 25 being heated whereby to fuse or bond the image surface of the image sheet 11 to the clear plastic sheet by the adhesive coating 21. Heating roll 25 has a temperature control device 27 whereby to adjust the temperature of the roll 25 dependent on the parameters of the assembled sheets 24.

Reverting back to FIG. 3 it can be seen that the clear plastic film sheet is larger than the image sheet 11 whereby a marginal extension portion 16 is provided all about the image sheet 11. The marginal extension portion is of a width which is greater than the side wall 15 of the frame member 17 for reasons as will be described later. However, it is conceivable that if the frame member and print was to be mounted into a decorative contour frame that the marginal extension portion 16 may not be greater than the side walls 15 of the rectangular frame member as it would not be visible.

After the image sheet is laminated on the clear plastic film sheet and before assembly onto the frame member 17, it is necessary to remove the backing sheet 22. Because the backing sheet is provided with an adhesive release coating 23, such as silicone coating, it is released from the tacky surface of the adhesive coating 21 all about the image sheet 11. The back of the image sheet 11 is paper as the image is usually printed on a paper sheet. With the backing sheet 22 having been removed the clear plastic film sheet 13 is secured to the frame 17 having the canvas 19 secured thereon, as illustrated in FIG. 5. The image sheet 11 is aligned with the canvas sheet 19 and the marginal extension portion 16 is folded over the side walls 15 of the frame. A folded concealed pleat 30 is formed at corners 31 of the rectangular frame 17 with the marginal extension portions 16 held taunt over the side wall 15 of the rectangular frame and secured to a flat rear wall 32 of the frame elements 18 by fasteners such as staple fasteners 33. A paint coating 34 is then applied to the marginal extension portion 16 disposed over the side walls 15 of the frame member 17. It is pointed out that if the image 12 of the image sheet exceeds the outer edges of the canvas portion 19, this paint coating 34 would cover the exceeding image portion and provide a substantially straight delineation of the image all about the frame.

Figure 7:
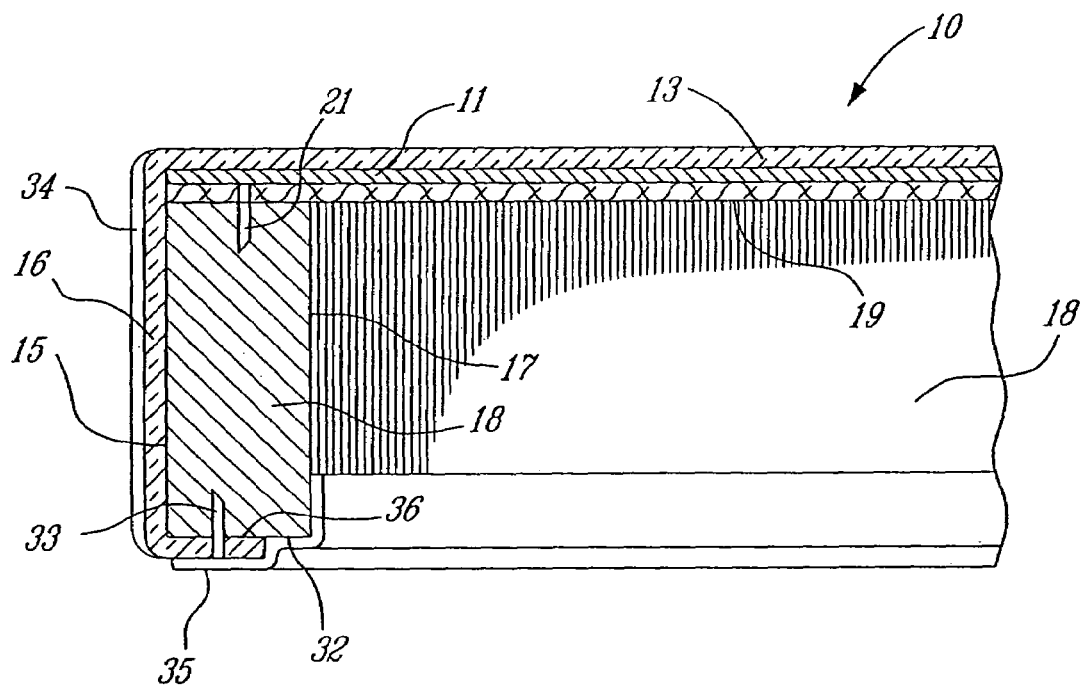
FIG. 7 is an enlarged cross-section and fragmented view showing the assembly of the component parts forming the composite laminated print on frame of the present invention

As shown in FIG. 7 the composite laminated print on frame of the present invention provides for an image printed on a paper sheet to be visible through a clear plastic coating film, which preferably, but not exclusively, is provided with an embossed textured pattern and preferably resembling a canvas pattern. A clear gel can also be applied on the outer-surface of the clear plastic film sheet by the use of a brush, whereby brush strokes would be visible and appear to be in the image. This gives the impression that the textured pattern is in the image. The real canvas material 19 is visible and accessible from the back of the frame. Also, for esthetic reasons an adhesive decorative tape 35 may be adhesively secured over the staple fasteners 33 and at least a section of the end portion 36 of the marginal extension portion of the clear plastic film sheet. Therefore, the laminated print on the frame appears to be a genuine printed or painted image disposed directly on canvas which is visible and touchable from the rear of the hollow frame.

Briefly summarizing the method of constructing the composite laminated print and frame 10 of the present invention, it comprises providing a circumferential hollow frame member having a flat outer contour surface. A canvas sheet is disposed taunt over the frame. The canvas sheet is secured to the flat outer contour surface of the frame by fastening means. A printed image sheet is laminated onto a clear plastic film sheet with an image of the image sheet facing the clear plastic film sheet. The plastic film sheet has a marginal extension portion all about the image sheet. The clear plastic film sheet is disposed over the frame member 17 with the printed image 12 aligned with the flat outer contour surface and the image facing outwardly. The marginal extension portion is disposed over a circumferential outer side wall 15 of the frame member 17 and is pulled taunt thereover. An end portion of the marginal extension portion is secured to a rear face of the frame member.

Before the step of laminating, the printed image sheet 11 is disposed at a predetermined location on an uncured adhesive backing of the clear plastic film sheet with the image 12 of the image sheet facing the adhesive. A backing sheet with an adhesive release coating is disposed over the uncured adhesive backing of the clear plastic film sheet and the disassembly of sheets is fed through a heat laminating machine to bond the image sheet to the adhesive backing of the clear plastic film sheet.

Before assembling the clear plastic film sheet with the image bonded thereon it is necessary to remove the backing sheet from the clear plastic film sheet.

It is within the ambit of the present invention to cover any obvious modifications of the embodiments described herein, provided such modifications fall within the scope of the appended claims.

What is claimed is:

1. A composite laminated print and frame comprising a circumferential hollow frame member having a flat outer contour surface, a canvas sheet-disposed taunt over said frame and secured about said flat outer contour surface, a printed image sheet is bonded on a clear plastic film sheet with an image of said image sheet facing said clear plastic film sheet, said plastic film sheet having a marginal extension portion all about said image sheet; said marginal extension portion extending over a circumferential outer side wall of said frame member and being held taunt by fastening means to secure same to said frame member whereby said image sheet, adhered to said plastic film sheet, is held taunt over said canvas sheet with said image facing outwardly; said canvas sheet being visible and touchable from a rear of said hollow frame member.

2. A composite laminated print and frame as claimed in claim 1 wherein said clear plastic film sheet is an embossed plastic film sheet having a visible pattern embossed therein.

3. A composite laminated print and frame as claimed in claim 2 wherein said visible pattern is a canvas texture embossment.

4. A composite laminated print and frame as claimed in claim 1 wherein said marginal extension portion has a width which is greater than the width of said frame member whereby an end portion of said marginal extension portion can be disposed over said outer side walls of said frame member and secured to a rear face of said frame member.

5. A composite laminated print and frame as claimed in claim 4 wherein said frame member is a rectangular hollow frame formed by straight frame members of rectangular cross-section, said marginal extension portion having a folded concealed pleat formed at corners of said rectangular frame with said marginal extension portion held taunt over said outer side walls of said rectangular frame to form a side wall covering, said side wall covering being painted to delineate said side wall covering from said image on said image sheet.

6. A composite laminated print and frame as claimed in claim 5 wherein said image is a rectangular image having a dimension corresponding to said canvas sheet.

7. A composite laminated print and frame as claimed in claim 4 wherein said fastening means is constituted by fasteners.

8. A composite laminated print and frame as claimed in claim 7 wherein said rear face is a flat rear wall of said frame member, said fasteners being staple fasteners, and an adhesive tape disposed over said staple, fasteners, and at least a section of said end portion of said marginal extension portion.

9. A composite laminated print and frame as claimed in claim 1 wherein said canvas sheet is secured to said flat outer contour surface by staple fasteners.

10. A composite laminated print and frame as claimed in claim 1 wherein said printed image sheet is a paper sheet.

11. A method of constructing a frame comprising the steps of: composite laminated
   i) providing a circumferential hollow frame member having flat outer contour surface,
   ii) disposing a canvas sheet taunt over said frame member,
   iii) securing said canvas sheet to said flat outer contour surface,
   iv) laminating a printed image sheet onto a clear plastic film sheet with an image of said image sheet facing said clear plastic film sheet, said plastic film sheet having a marginal extension portion all about said image sheet,
   v) disposing said clear plastic film sheet over said frame member with said printed image sheet aligned with said flat outer contour surface and said image facing outwardly,
   vi) disposing said marginal extension portion over a circumferential outer side wall of said frame member and pulling same taunt thereover, and
   vii) securing an end portion of said marginal extension portion to a rear face of said frame member.

12. A method as claimed in claim 11 wherein said step iv) comprises (a) disposing said printed image sheet at a predetermined location on an uncured adhesive backing of said clear plastic film sheet with said image of said image sheet facing said adhesive backing; (b) placing a backing sheet with an adhesive release coating over said uncured adhesive backing of said clear plastic film sheet, and (c) feeding said image sheet held between said clear plastic film sheet and said backing sheet though a heat laminating machine to bond said image sheet to said adhesive backing of said clear plastic film sheet.

13. A method as claimed in claim 12 wherein prior to step (v) there is provided the step of removing said backing sheet from said clear plastic film sheet having said image sheet bonded thereon.

14. A method as claimed in claim 13 wherein said step (iii) comprises stapling said canvas sheet to said flat outer contour surface.

15. A method as claimed in claim 13 wherein said step (vii) comprises stapling said end portion for securing same, and further comprising the step (viii) of securing an adhesive tape over said staples of said end portion and at least a section of said end portion of said marginal extension portion to conceal said staples of said end portion.

16. A method as claimed in claim 11 wherein said frame member is a rectangular frame member, said step (vi) further comprising forming a folded concealed pleat in said marginal extension portion at corners of said rectangular frame, and after step (vii) painting said marginal extension portion held taunt over outer side walls of said rectangular frame member.

* * * * *

UNITED STATES PATENT AND TRADEMARK OFFICE
CERTIFICATE OF CORRECTION

PATENT NO. : 6,920,712 B2 Page 1 of 1
APPLICATION NO. : 10/771456
DATED : July 26, 2005
INVENTOR(S) : Michael Chaimberg It is certified that error appears in the above-identified patent and that said Letters Patent is hereby corrected as shown below:

The spelling of the word "taunt" should be corrected to read -- taut -- as follows:

Column 1, lines 41, 47, 50, 57 and 67
Column 2, line 61
Column 4, lines 13 and 23
Column 4, Claim 1, lines 45, 52 and 55
Column 5, Claim 5, line 8
Column 5, Claim 11, line 34
Column 6, claim 11, line 5
Column 6, claim 16, line 39

Column 2, line 67, "201" should read -- 20' --

The preamble portion of claim 11 (lines 30 and 31) should read as follows:

-- A method of constructing a composite laminated print and frame comprising the steps of: --

Claim 12, line 17, "though" should read -- through --.

Signed and Sealed this

Fifth Day of June, 2007

JON W. DUDAS
*Director of the United States Patent and Trademark Office*